United States Patent
Zhang et al.

(10) Patent No.: US 12,040,443 B2
(45) Date of Patent: Jul. 16, 2024

(54) WELDABLE ALUMINUM TERMINAL PADS OF AN ELECTROCHEMICAL CELL

(71) Applicant: CPS TECHNOLOGY HOLDINGS LLC, New York, NY (US)

(72) Inventors: Xugang Zhang, Erie, PA (US); Jason D. Fuhr, Sussex, WI (US)

(73) Assignee: CPS Technology Holdings LLC, New York, NY (US)

( * ) Notice: Subject to any disclaimer, the term of this patent is extended or adjusted under 35 U.S.C. 154(b) by 51 days.

(21) Appl. No.: 17/545,548

(22) Filed: Dec. 8, 2021

(65) Prior Publication Data

US 2022/0102795 A1 Mar. 31, 2022

Related U.S. Application Data (63) Continuation of application No. 16/312,889, filed as application No. PCT/US2017/044728 on Jul. 31, 2017, now Pat. No. 11,233,289.
(Continued)

(51) Int. Cl.
  *H01M 10/0525* (2010.01)
  *H01M 50/176* (2021.01)
  (Continued)

(52) U.S. Cl.
  CPC ..... *H01M 10/0525* (2013.01); *H01M 50/176* (2021.01); *H01M 50/209* (2021.01);
  (Continued)

(58) Field of Classification Search
  CPC ............. H01M 50/209; H01M 50/227; H01M 50/271; H01M 50/296; H01M 50/55;
  (Continued)

(56) References Cited

U.S. PATENT DOCUMENTS

| 5,304,431 A | 4/1994 | Schumm, Jr. |
| 5,691,073 A | 11/1997 | Vu et al. |

(Continued)

FOREIGN PATENT DOCUMENTS

| CN | 101176908 A | 5/2008 |
| CN | 101670482 A | 3/2010 |

(Continued)

OTHER PUBLICATIONS

International Search Report and Written Opinion dated Sep. 19, 2017 for International Application No. PCT/US2017/044728, consisting of 12-pages.

*Primary Examiner* — Ula C Ruddock
*Assistant Examiner* — Sarika Gupta
(74) *Attorney, Agent, or Firm* — Weisberg I.P. Law, P.A.

(57) ABSTRACT

A battery system includes an electrochemical cell. The electrochemical cell includes a cover having an opening. The electrochemical cell also includes an aluminum terminal pad disposed proximate an outer surface of the cover. The pad opening includes a tapered surface such that the pad opening has a larger cross-sectional width proximate an upper surface of the aluminum terminal pad than proximate a lower surface of the aluminum terminal pad opposite the upper surface and facing the outer surface of the cover. The electrochemical cell also includes a rivet having a body portion extending through the opening in the cover, a head portion disposed in the pad opening of the aluminum terminal pad, and a shoulder extending between the body portion and the head portion. The head portion includes an inverted cone shape corresponding with the tapered surface of the pad opening.

19 Claims, 8 Drawing Sheets

Related U.S. Application Data (60) Provisional application No. 62/369,724, filed on Aug. 1, 2016.

(51) Int. Cl.
| | |
|---|---|
| *H01M 50/209* | (2021.01) |
| *H01M 50/227* | (2021.01) |
| *H01M 50/271* | (2021.01) |
| *H01M 50/296* | (2021.01) |
| *H01M 50/55* | (2021.01) |
| *H01M 50/553* | (2021.01) |
| *H01M 50/562* | (2021.01) |

(52) U.S. Cl.
CPC ....... *H01M 50/227* (2021.01); *H01M 50/271* (2021.01); *H01M 50/296* (2021.01); *H01M 50/55* (2021.01); *H01M 50/553* (2021.01); *H01M 50/562* (2021.01); *H01M 2220/10* (2013.01)

(58) Field of Classification Search
CPC ............. H01M 50/553; H01M 50/562; H01M 2220/10; H01M 50/169; H01M 50/103; H01M 50/543; H01M 50/516
See application file for complete search history.

(56) References Cited

U.S. PATENT DOCUMENTS

| | | | |
|---|---|---|---|
| 5,707,756 A | 1/1998 | Inoue et al. | |
| 5,741,606 A | 4/1998 | Mayer et al. | |
| 5,766,791 A | 6/1998 | Takahashi et al. | |
| 5,879,832 A | 3/1999 | Vu et al. | |
| 5,985,479 A | 11/1999 | Boolish et al. | |
| 6,037,071 A | 3/2000 | Poirier et al. | |
| 6,210,824 B1 | 4/2001 | Sullivan et al. | |
| 6,426,163 B1 | 7/2002 | Pasquier et al. | |
| 6,451,473 B1 | 9/2002 | Saito et al. | |
| 6,900,616 B2 | 5/2005 | Burrus, IV et al. | |
| 7,433,794 B1 | 10/2008 | Berdichevsky et al. | |
| 7,470,482 B2 | 12/2008 | Takamura et al. | |
| 7,601,455 B2 | 10/2009 | Yoon | |
| 7,642,008 B2 | 1/2010 | Kim et al. | |
| 7,749,642 B2 | 7/2010 | Chang et al. | |
| 7,763,375 B2 | 7/2010 | Igoris et al. | |
| 7,879,484 B2 | 2/2011 | Hyung et al. | |
| 8,216,707 B2 | 7/2012 | Byun et al. | |
| 8,409,736 B2 | 4/2013 | Wang et al. | |
| 8,435,660 B2 | 5/2013 | Kim et al. | |
| 8,512,895 B2 | 8/2013 | Byun et al. | |
| 8,623,548 B2 | 1/2014 | Kim et al. | |
| 8,632,911 B2 | 1/2014 | Byun et al. | |
| 8,940,422 B2 | 1/2015 | Ito et al. | |
| 8,951,663 B2 | 2/2015 | Kim | |
| 8,968,898 B2 | 3/2015 | Lee et al. | |
| 8,993,149 B2 | 3/2015 | Vu | |
| 9,012,050 B2 | 4/2015 | Byun et al. | |
| 9,099,732 B2 | 8/2015 | Kim et al. | |
| 9,190,636 B2 | 11/2015 | Kim | |
| 9,252,400 B2 | 2/2016 | LePort et al. | |
| 9,257,686 B2 | 2/2016 | Kim et al. | |
| 9,324,990 B2 | 4/2016 | Han | |
| 9,425,453 B2 | 8/2016 | Han et al. | |
| 2001/0049054 A1* | 12/2001 | Enomoto | H01M 50/566 429/177 |
| 2006/0275657 A1 | 12/2006 | Kozuki et al. | |
| 2008/0220316 A1 | 9/2008 | Berkowitz et al. | |
| 2008/0254343 A1 | 10/2008 | Kaplin et al. | |
| 2010/0227217 A1 | 9/2010 | Fujikawa et al. | |
| 2010/0291422 A1 | 11/2010 | Deng et al. | |
| 2011/0052949 A1 | 3/2011 | Byun et al. | |
| 2011/0070467 A1 | 3/2011 | Meintschel et al. | |
| 2011/0217572 A1 | 9/2011 | Yebka et al. | |
| 2012/0148908 A1* | 6/2012 | Ito | H01M 50/571 29/874 |
| 2012/0189908 A1* | 7/2012 | Tsutsumi | H01M 50/159 29/623.2 |
| 2012/0258339 A1 | 10/2012 | Kim et al. | |
| 2013/0266830 A1 | 10/2013 | Byun et al. | |
| 2013/0337297 A1 | 12/2013 | Lee et al. | |
| 2014/0205891 A1 | 7/2014 | Okada et al. | |
| 2014/0205897 A1 | 7/2014 | Byun et al. | |
| 2014/0212741 A1 | 7/2014 | Kim | |
| 2014/0212743 A1 | 7/2014 | Kim | |
| 2014/0349152 A1 | 11/2014 | Guen | |
| 2014/0377601 A1 | 12/2014 | Kim | |
| 2014/0377603 A1 | 12/2014 | Eberle et al. | |
| 2015/0079432 A1 | 3/2015 | Okuda et al. | |
| 2015/0171411 A1 | 6/2015 | Kobayashi et al. | |
| 2015/0207132 A1 | 7/2015 | Minagata et al. | |
| 2015/0214530 A1* | 7/2015 | Lee | H01M 50/209 429/158 |
| 2015/0221927 A1 | 8/2015 | Lee | |
| 2015/0243960 A1 | 8/2015 | Imanishi et al. | |
| 2015/0270528 A1 | 9/2015 | Guen | |
| 2015/0295211 A1 | 10/2015 | Kim et al. | |
| 2015/0325833 A1 | 11/2015 | Harayama et al. | |
| 2016/0043356 A1 | 2/2016 | Sunada et al. | |

FOREIGN PATENT DOCUMENTS

| | | |
|---|---|---|
| CN | 102110798 A | 6/2011 |
| CN | 102623657 A | 8/2012 |
| CN | 103943809 A | 7/2014 |
| CN | 105229763 A | 1/2016 |
| CN | 105598303 A | 5/2016 |
| DE | 102012200868 A1 | 7/2013 |
| DE | 102014200202 A1 | 7/2015 |
| EP | 0959508 A1 | 11/1999 |
| EP | 1076350 A2 | 2/2001 |
| EP | 2806477 A1 | 11/2014 |
| EP | 2846380 A1 | 3/2015 |
| JP | 2012226834 A | 11/2012 |

\* cited by examiner

WELDABLE ALUMINUM TERMINAL PADS OF AN ELECTROCHEMICAL CELL

CROSS-REFERENCE TO RELATED APPLICATIONS

This application is Continuation of U.S. patent application Ser. No. 16/312,889, entitled "WELDABLE ALUMINUM TERMINAL PADS OF AN ELECTROCHEMICAL CELL," filed on Dec. 21, 2018, which is a 35 U.S.C. § 371 of International Application No. PCT/US2017/044728 entitled "WELDABLE ALUMINUM TERMINAL PADS OF AN ELECTROCHEMICAL CELL," filed on Jul. 31, 2017, which claims priority to and the benefit of U.S. Provisional Application Ser. No. 62/369,724, entitled "WELDABLE ALUMINUM INTERFACE TERMINALS," filed Aug. 1, 2016, which are hereby incorporated by reference in their entireties for all purposes.

BACKGROUND

The present disclosure relates generally to the field of batteries and battery modules. More specifically, the present disclosure relates to weldable aluminum terminal pads of lithium-ion electrochemical cells.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include full electric vehicles (EVs or FEVs) that utilize electric power for all motive force, hybrid electric vehicles (HEVs) that combine an internal combustion engine propulsion system and a battery-powered electric propulsion system, mild hybrid systems (MHEVs) that disable the internal combustion engine when the vehicle is idling. xEVs also include micro-hybrid electric vehicles (mHEVs), which use a "Stop-Start" system similar to the mild hybrids, but the micro-hybrid systems of a mHEV may or may not supply power assist to the internal combustion engine and operates at a voltage below 60V.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

Similar benefits may also be realized in stationary applications for battery systems. For example, battery systems may also be viable alternatives or supplements to systems that operate based on fossil fuel combustion. Homes, offices, buildings, and similar locations, for instance, often include backup power sources such as gas-powered electrical generators used in the event of a central power failure (e.g., due to inclement weather). Similarly, certain settings, such as temporary offices, temporary housing, or other settings located remotely from a power grid, may not necessarily be tied to an electrical grid, and may instead rely on a source of energy from a relatively portable source such as an engine-driven electrical generator. Stationary battery systems may be an attractive alternative for such settings not only because they can be discharged with relatively low emissions compared to combustion processes, but also because other sources of energy, such as wind and solar, may be coupled to such stationary battery systems to enable energy capture for later use.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed toward a battery system having an electrochemical cell. The electrochemical cell includes a cover having an opening therein. The electrochemical cell also includes an aluminum terminal pad disposed proximate an outer surface of the cover, and having a pad opening aligned with the opening in the cover. The pad opening includes a tapered surface such that the pad opening has a larger cross-sectional width proximate an upper surface of the aluminum terminal pad than proximate a lower surface of the aluminum terminal pad opposite the upper surface and facing the outer surface of the cover. The electrochemical cell also includes a rivet having a body portion extending through the opening in the cover, a head portion disposed in the pad opening of the aluminum terminal pad, and a shoulder extending between the body portion and the head portion. The head portion includes an inverted cone shape corresponding with the tapered surface of the pad opening and having a maximum cross-sectional width greater than a minimum cross-sectional width of the pad opening.

Present embodiments are also directed toward a method of manufacturing a terminal assembly of an electrochemical cell. The method includes aligning a cover opening of a cover with a pad opening of an aluminum terminal pad, where the pad opening is formed by a tapered surface. The method also includes extending a rivet through the cover opening and the pad opening such that a portion of a head of the rivet is disposed higher than the aluminum terminal pad. The method also includes crimping the head of the rivet to cause the head of the rivet to form an inverted cone shape against the tapered surface of the pad opening.

Present embodiments are also directed toward an electrochemical cell having a cover with an opening therein. The electrochemical cell also includes an aluminum terminal pad having a first portion disposed proximate an outer surface of the cover, and a recess wall extending downwardly from the first portion through the opening in the cover. The electrochemical cell also includes a current collector having a bulb forming an internal space that receives the recess wall of the aluminum terminal pad so as to sheathe the recess wall within the internal space of the bulb in a clinched configuration.

DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various high voltage energy storage/expending applications (e.g., electrical grid power storage systems). Such battery systems may include one or more battery modules, each battery module having a number of battery cells (e.g., lithium-ion [Li-ion] electrochemical cells) arranged to provide particular voltages and/or currents. It should be noted that while the current discussion focuses on weldable aluminum terminal pads of a lithium-ion electrochemical cell, embodiments of the weldable aluminum terminal pads may be employed in any suitable electrochemical cell for other implementations. As an example, battery modules in accordance with present embodiments may be incorporated with, or provide power to, electric vehicles or stationary power systems (e.g., non-automotive systems).

In accordance with present embodiments, each lithium-ion electrochemical cell may include terminal configurations that enable aluminum-to-aluminum welding to bus bars at both the positive and negative terminals of the lithium-ion electrochemical cell. For example, lithium-ion electrochemical cells may include an aluminum terminal and a copper terminal. The aluminum terminal of a first electrochemical cell may be electrically coupled to the copper terminal of a second electrochemical cell adjacent the first electrochemical cell. Traditional configurations may include copper-to-copper welding at the copper terminal (e.g., on a copper portion of a bi-metallic bus bar), which may involve techniques (e.g., laser welding techniques) that generate enough heat to melt a gasket of the terminal. Melting of the gasket may lead to egress of fluids (e.g., electrolyte) out of the electrochemical cell, and/or ingress of fluids (e.g., water) and moisture into the electrochemical cell. Because aluminum includes a lower melting temperature than copper, aluminum-to-aluminum welding can be conducted at lower heats that do not melt the terminal gasket.

To facilitate the aluminum-to-aluminum welding, an aluminum path from the copper terminal of the lithium-ion electrochemical cell may be established (e.g., via an aluminum terminal pad and, in some embodiments, other aluminum components), such that an aluminum bus bar may be welded to the aluminum terminal pad, and to an adjacent aluminum terminal (or terminal pad) of an adjacent electrochemical cell. In accordance with present embodiments, the aluminum terminal pad corresponding with the copper terminal may be established without requiring a bi-metallic component. For example, in a first embodiment, a press (e.g., utilizing hydraulic and/or pneumatic actuation) may be used to encapsulate or sheathing a portion of the aluminum terminal pad within an extruded inner bulb of the copper terminal (or within the extruded inner bulb of a copper component coupled to the copper terminal). The aluminum terminal pad may then be welded to first end of an aluminum bus bar, and a second end of the aluminum bus bar may be welded to an adjacent aluminum terminal (or aluminum terminal pad, in embodiments where the aluminum terminal also includes the aluminum terminal pad coupled thereto). Encapsulating or sheathing the portion of the aluminum terminal pad within the extruded inner bulb of the copper terminal along with upper and lower gaskets ensures electrical connection therebetween, and blocks potential short-circuits.

In a second embodiment, a crimping process may be used to sandwich an aluminum terminal pad between a first end of a rivet (e.g., copper rivet, aluminum rivet, or bi-metal rivet having a copper base and aluminum post) and a second end of the rivet, where the first and second ends are joined by a shoulder proximate a tapered opening in the aluminum terminal pad. For example, the first end of the rivet extends through the tapered opening of the aluminum terminal pad. The tapered opening of the aluminum terminal pad tapers outwardly from the rivet starting from the shoulder of the rivet and working upwardly toward a top surface of the first end of the rivet. In other words, a tapered surface of the tapered opening tapers away from the rivet. A crimp may sandwich the assembly together, thereby pressing the top surface of the first end of the rivet downwardly into the tapered surface of the tapered opening in the aluminum terminal pad, causing the first end of the rivet to deform to fill the tapered opening. In other words, following the crimping process, the rivet is bottlenecked (i.e., at a minimum cross-sectional width of the tapered opening) by the aluminum terminal pad. The shoulder is sized to facilitate a compression ratio enabling sufficient contact between the rivet (which may correspond with the aluminum, copper, or bi-metal terminal), the aluminum terminal pad, and gaskets, thereby blocking potential short-circuits, while also facilitating a desired amount of compression of insulating gaskets of the terminal assembly. During the rivet compressing process, the rivet body may be bulged outwardly to fill any potential gaps between the rivet post and the gasket, to further improve the seal. Certain embodiments may include an all copper rivet (or a nickel or zinc plated copper rivet) corresponding with the copper terminal, which may be less expensive than a bi-metallic rivet transitioning from copper-to-aluminum.

Figure 1:
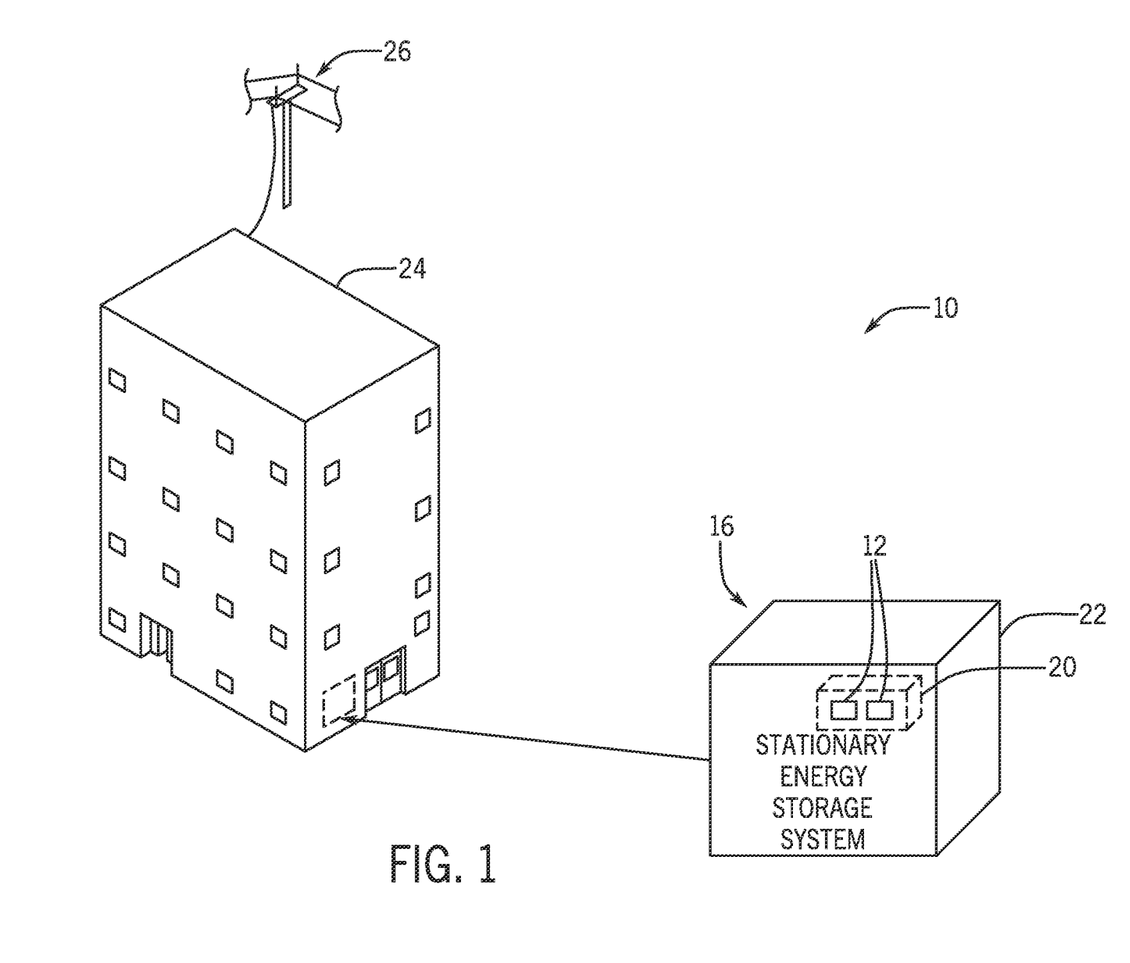
FIG. 1 is a schematic view of a lithium ion battery module configured to be used in a stationary energy storage system, in accordance with aspects of the present disclosure.

FIG. 1 is a schematic view of an embodiment of a battery system 10 in which battery modules 12 (e.g., lithium ion battery modules) are configured to be used in a stationary energy storage system 16. More specifically, the battery modules 12 may be used as all or a part of a stationary energy storage drawer 20. The stationary energy storage drawer 20 may be removably coupled to a battery system housing 22 (e.g., cabinet) of the stationary energy storage system 16. Each stationary energy storage drawer 20 may include one or more battery modules 12 (e.g., two battery modules 12 in the illustrated embodiment), and the stationary energy storage system 16 may include one or more of the stationary energy storage drawers 20.

By way of example, each battery module 12 may have a number of lithium-ion electrochemical cells, such as between 10 and 20 electrochemical cells. The general configuration of the battery module 12 will be described in further detail below, with reference to later drawings.

As shown, a facility 24 may include a building or similar setting normally connected to an electrical power grid 26 or other main source of energy to provide power for everyday power consumption. However, in other embodiments, the facility 24 may be a facility that is not connected to the electrical power grid 26 and therefore completely relies on other means to provide electrical energy (e.g., the stationary storage system 16). Further, the facility 24 may be a home or other setting. The stationary energy storage system 16 may be incorporated into or otherwise connected to an electrical grid of the facility 24 to provide power as needed. As non-limiting examples, the stationary energy storage system 16 may provide power to the facility 24 as a backup to the electrical power grid 26 (e.g., due to power outage), for power conditioning, for supplementing power or offsetting power consumption from the electrical power grid 26, and so forth.

The present disclosure is directed toward weldable aluminum terminal pads (and corresponding electrical paths thereof) of an electrochemical cell used in, for example, the battery modules 12 of FIG. 1. However, it should be noted that the electrochemical cells may be used in other applications, such as a battery module of an electric vehicle. The weldable aluminum terminal pads (and corresponding electrical paths thereof) generally reduces a cost of the electrochemical cell, enhances a seal of the terminal of the electrochemical cell, simplifies manufacturing of welding processes of the electrochemical cell, or a combination thereof.

Figure 2:
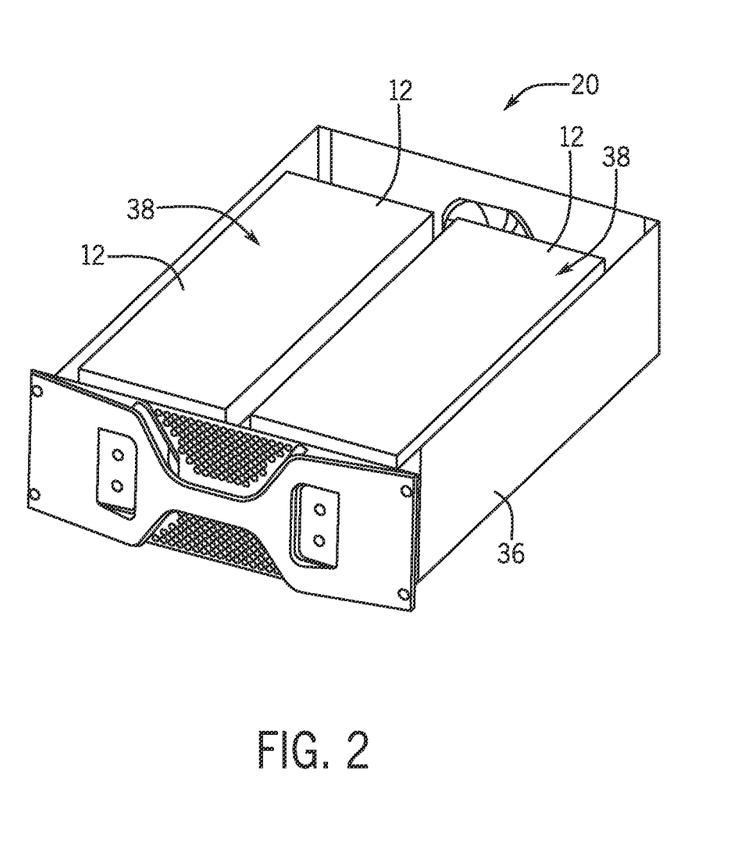
FIG. 2 is a perspective view of an embodiment of a stationary energy storage drawer having two battery modules positioned side-by-side therein, in accordance with aspects of the present disclosure.

FIG. 2 illustrates an embodiment of the stationary energy storage drawer 20 having two battery modules 12 positioned side-by-side within an enclosure 36 of the stationary energy storage drawer 20. As previously discussed, one or more stationary energy storage drawers 20 may be removably coupled to the housing 22 (e.g., of FIG. 1) of the stationary energy storage system 16 (e.g., of FIG. 1). Each stationary energy storage drawer 20 may include one or more of the battery modules 12 that may be positioned side-by side within the stationary drawer enclosure 36. Each of the battery modules 12 may include a number of electrochemical cells (e.g., lithium-ion electrochemical cells). It should be noted that "battery cells" and "electrochemical cells" may be used interchangeably throughout the description below.

The electrochemical cells of each battery module 12 may be partially or substantially enclosed within a battery module housing 38 of the corresponding battery module 12. The battery module housing 38 may be a molded plastic housing that may have a complementary shape to the enclosed electrochemical cells, or may be any appropriate form. With reference to the battery module 12 of FIGS. 1 and 2, the electrochemical cells (not shown) disposed therein may include weldable aluminum terminal pads configured to be welded to aluminum bus bars. The weldable aluminum terminal pads may be coupled to aluminum terminals, to nickel or zinc plated copper terminals, or to bi-metal (e.g., aluminum post, copper base) terminals, in some embodiments without welding the aluminum terminal pad to the copper terminal. For example, a pressing or crimping process may enable the above-described features. These and other features will be described in detail below with reference to later drawings.

Figure 3:
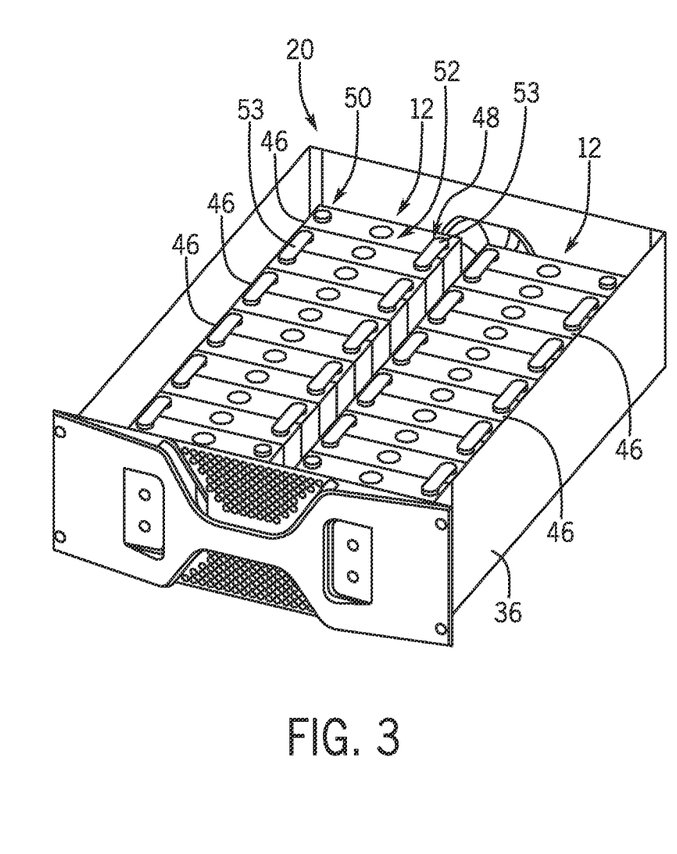
FIG. 3 is a perspective view of an embodiment of a stationary energy storage drawer having two battery modules of individual electrochemical cells positioned side-by-side within a stationary drawer housing, in accordance with aspects of the present disclosure.

FIG. 3 illustrates the stationary energy storage drawer 20 having two battery modules 12 (illustrated without an upper portion of the battery module housing 38), each having several electrochemical cells 46 oriented parallel to one another within the battery module 12. In the illustrated embodiment, the electrochemical cells 46 are positioned in rows within the battery modules 12. While illustrated as including eleven electrochemical cells 46, other numbers and configurations of the electrochemical cells 46 may be provided. However, the electrochemical cells 46 will generally be provided in an amount and configuration so as to have a sufficient energy density, voltage, current, capacity, and so forth, for a particular application. Further, while the electrochemical cells 46 are shown as having a polygonal or rectangular shape, in other embodiments, the electrochemical cells 46 may be prismatic, cylindrical, or another shape, or a combination thereof.

Each of the electrochemical cells 46 may include a number of terminals (e.g., two terminals). For example, the electrochemical cells 46 may each include a positive terminal assembly 48 (e.g., aluminum terminal) and a negative terminal assembly 50 (e.g., bi-metal terminal with aluminum post and copper base, or copper terminal) at a first end (a terminal end) of the electrochemical cell 46. The terminal assemblies 48, 50 are electrically connected to electrochemically active materials contained within a body 52 of the electrochemical cell 46. Bus bars 53 (e.g., aluminum bus bars) extend between adjacent terminal assemblies 48, 50 of adjacent electrochemical cells 46. The electrochemical cells 46 are illustrated as electrically connected in a series arrangement within the battery module 12, although other configurations (e.g., parallel arrangement, hybrid series/parallel arrangement) are also possible.

Figure 4:
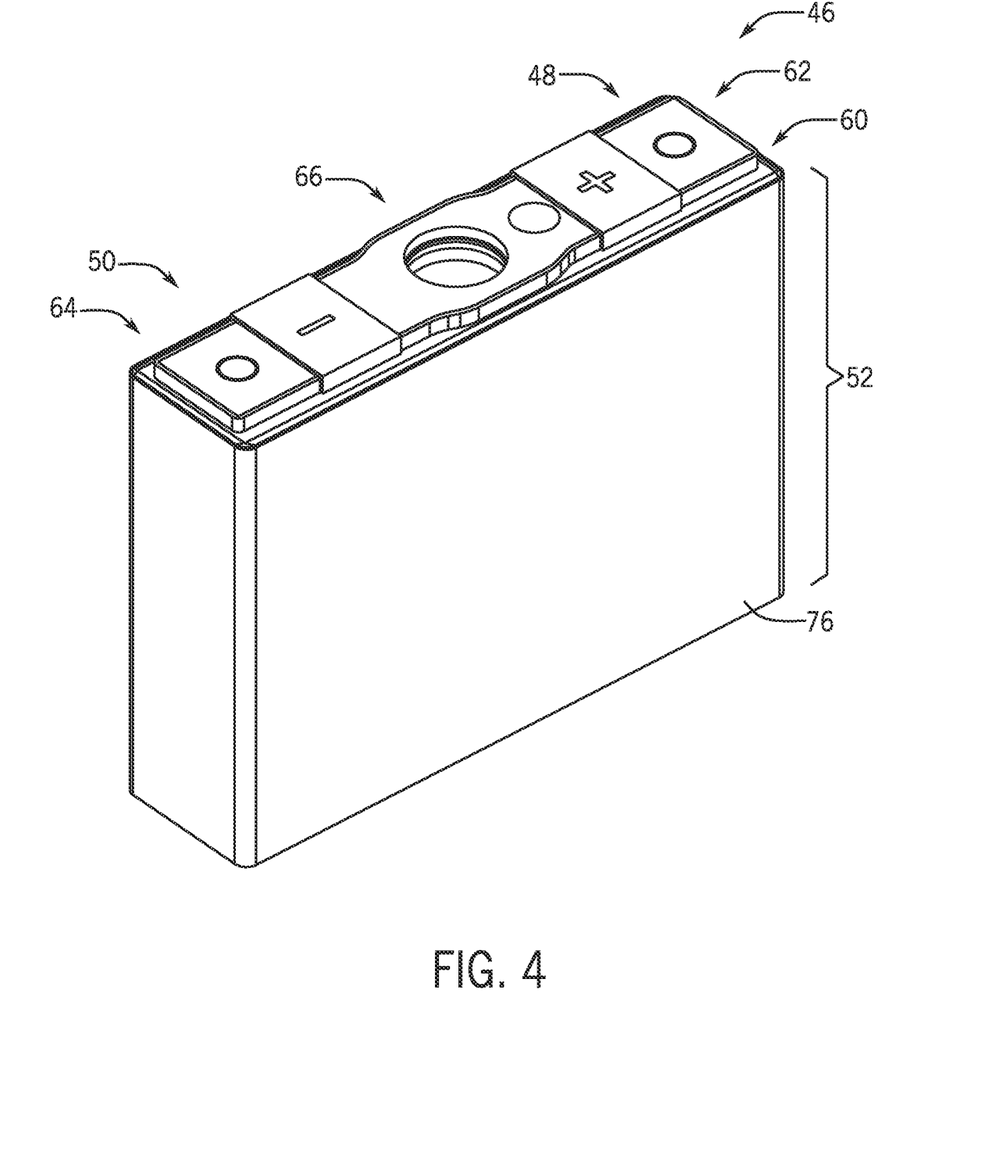
FIG. 4 is a perspective view of an embodiment of an electrochemical cell having weldable aluminum terminal pads, in accordance with aspects of the present disclosure.

FIG. 4 is a perspective view of an embodiment of one of the electrochemical cells 46. The illustrated electrochemical cell 46 may include a positive terminal assembly 48 and a negative terminal assembly 50 (where only portions of the terminal assemblies 48, 50 are visible in the illustrated embodiment). The terminal assemblies 48, 50 electrically connect electrochemically active materials (e.g., contained within a casing 76 of a body 52 of the electrochemical cell 46) with weldable aluminum terminal pads 62, 64 of the electrochemical cell 46. As will be appreciated in view of the description below, the negative terminal assembly 50 may include an electrical path that transitions from copper-to-aluminum. For example, a copper terminal collector (not shown) may couple with an electrode of the electrochemical cell 46 inside the casing 76 of the electrochemical cell 46. The copper-to-aluminum transition may extend from the copper terminal collector to the weldable aluminum terminal pad 64 corresponding with the negative terminal assembly 50. In some embodiments, the weldable terminal pad 64 is the aluminum portion of the copper-to-aluminum transition. Further, in some embodiments, the copper-to-aluminum transition may include no welding and no bi-metallic components. The weldable aluminum terminal pads 62, 64 may be referred to as "weldable" with reference to a welding process between a bus bar (e.g., the bus bar 53 of FIG. 3) extending between the positive weldable aluminum terminal pad 62 of a first cell, and the negative weldable aluminum terminal pad 64 of a second cell adjacent to the first cell. The weldable aluminum terminal pads 62, 64 may be coupled to components of the terminal assemblies 48, 50 disposed between the corresponding current collectors (not shown) and the weldable aluminum terminal pads 62, 64, or the terminal pads 62, 64 may be directly coupled to the current collectors (not shown).

Figure 5:
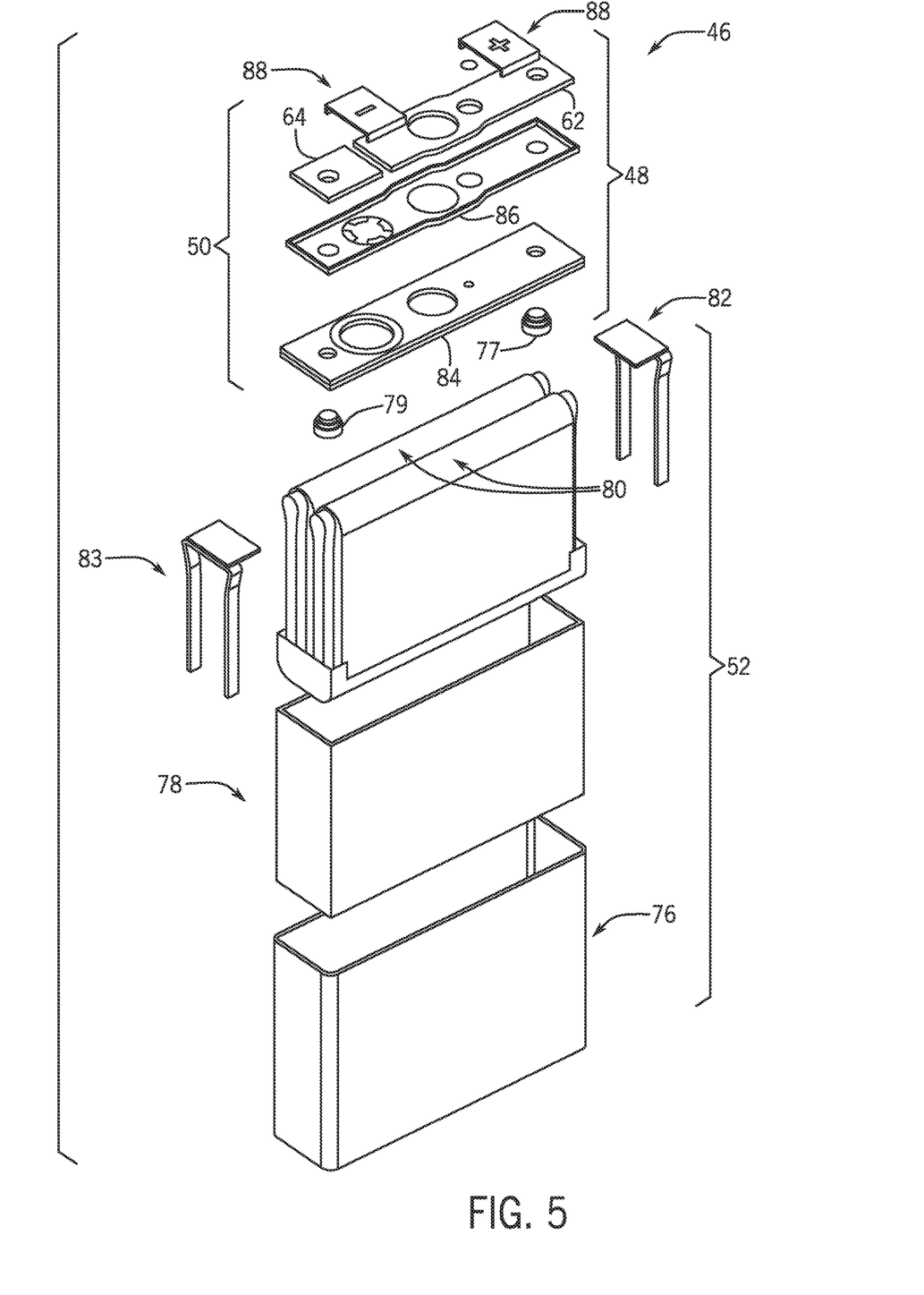
FIG. 5 is an exploded view of an embodiment of the electrochemical cell of FIG. 4, in accordance with aspects of the present disclosure.

FIG. 5 is an exploded perspective view of an embodiment of the electrochemical cell 46 having the aforementioned weldable aluminum terminal pads 62, 64, among other components. It should be noted that, although the positive weldable aluminum terminal pad 62 in the illustrated embodiment is longer than the negative weldable aluminum terminal pad 64, the pads 62, 64 may be of equal length or size in another embodiment.

As illustrated, the body 52 of the electrochemical cell 46 may include the casing 76 (e.g., can) and an insulation pouch 78. Within the casing 76 and the insulation pouch 78, the body 52 of the electrochemical cell 46 may include one or more coil stacks 80 (e.g., each having electrodes). The electrochemically active materials of the electrochemical cell 46 may be disposed within the coil stacks 80. As shown, the electrochemical cell 46 may include two coil stacks 80 corresponding with two cell elements, where the two cell elements are coupled in parallel and disposed in the casing 76.

The electrochemical cell 46 may include a positive current collector 82 (e.g., having an aluminum material) disposed below the positive terminal 48 and a negative current collector 83 (e.g., having a copper material) disposed below the negative terminal 50. The current collectors 82, 83 may be electrically coupled to the coil stacks 80. The electrochemical cell 46 may include a cover 84 (e.g., aluminum cover) that may enclose the coil stack 80 and the current collectors 82, 83 within the casing 76. Terminal connection components 77, 79 of the terminal assemblies 48, 50 may couple with the current collectors 82, 83 and extend through the cover 84. In some embodiments, the terminal connection components 77, 79 may be integral with the corresponding current collectors 82, 83. The electrochemical cell 46 may include a terminal insulator 86 that may be positioned above or below the cover 84, although multiple insulators (e.g., gaskets) may be used in other embodiments. For example, in the illustrated embodiment, the terminal assemblies 48, 50 extend through the terminal insulator 86, but in other embodiments, each terminal assembly 48 and 50 may include its own insulator/gasket. Further, as will be appreciated in FIGS. 6-15, insulating gaskets may be disposed proximate an inner surface of the cover 84, an outer surface of the cover 84, or both.

Figure 6:
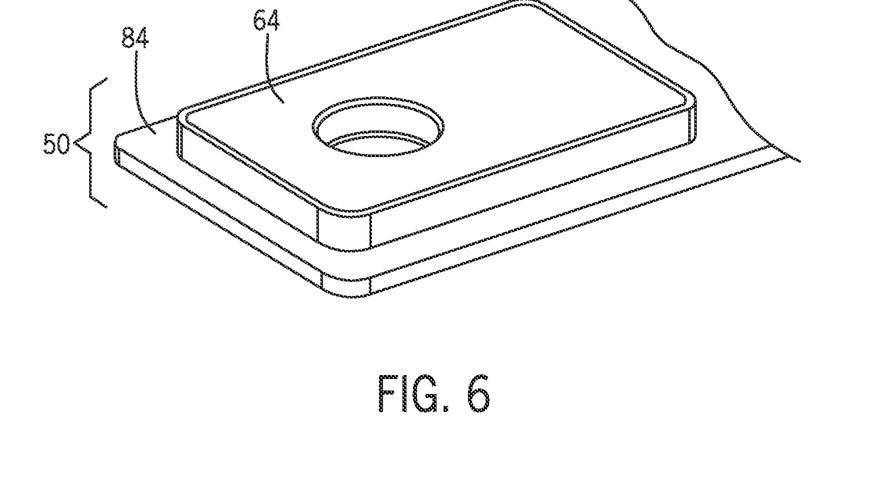
FIG. 6 is a perspective view of an embodiment of a terminal assembly having a weldable aluminum terminal pad for use in the electrochemical cell of FIG. 4, in accordance with an aspect of the present disclosure.
Figure 7:
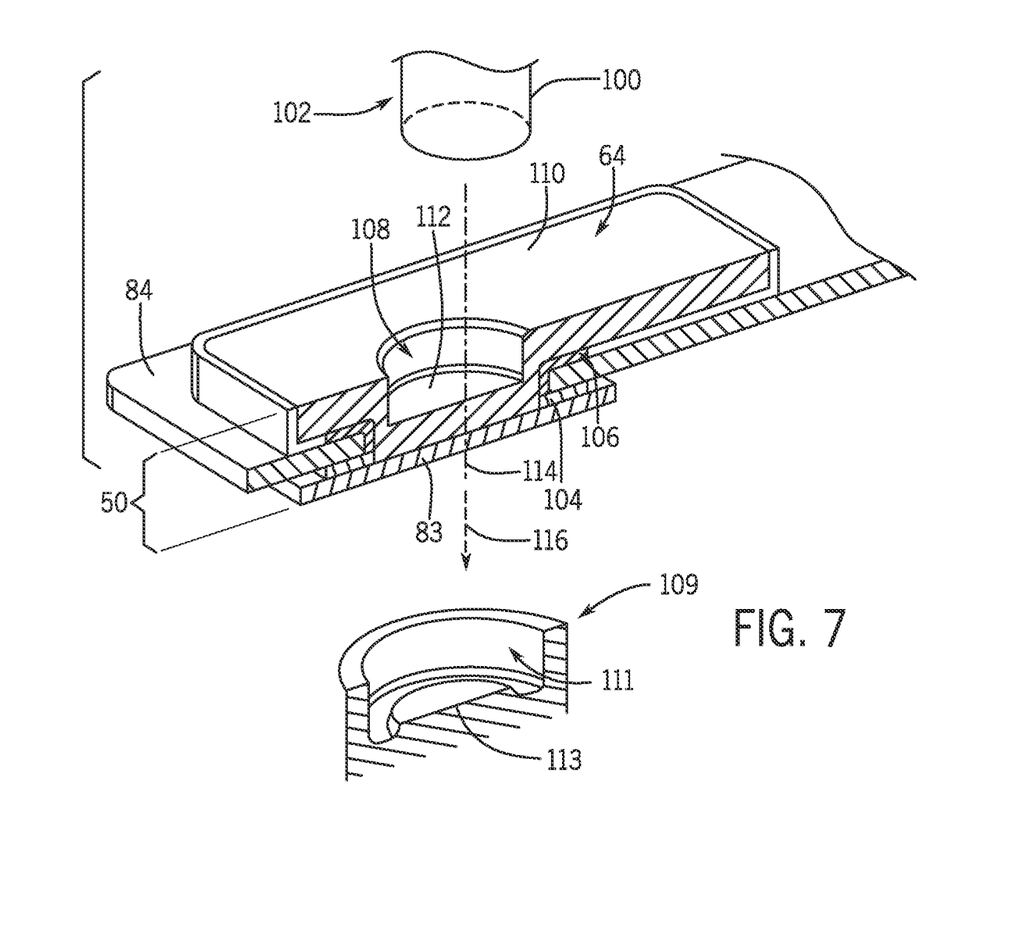
FIG. 7 is a cross-sectional perspective view of an embodiment of the terminal assembly having the weldable aluminum terminal pad of FIG. 6 in a pre-press condition, in accordance with an aspect of the present disclosure.
Figure 8:
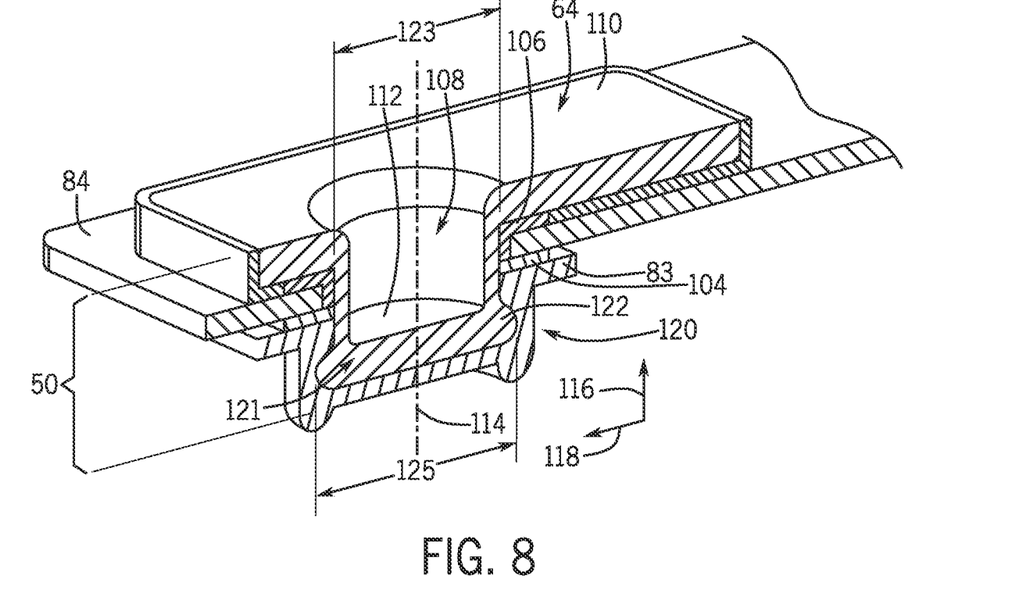
FIG. 8 is a cross-sectional perspective view of an embodiment of the terminal assembly having the weldable aluminum terminal pad of FIG. 6 in a post-press condition, in accordance with an aspect of the present disclosure.

The terminal pads 62, 64 may be positioned axially above the cover 84 and may be coupled to the terminal connection components 77, 79, or directly to the current collectors 82, 83 in embodiments where the terminal connection components 77, 79 are integral with the current collectors 82, 83, as previously discussed. The weldable aluminum terminal pads 62, 64, as will be described with reference to later figures, may couple with the terminal connection components 77, 79 (or current collectors 82, 83, or some other intervening component[s]) to form a substantially flat surface configured to receive (and be welded to) an aluminum bus bar. For example, a press style coupling (e.g., hydraulic and/or pneumatic press style coupling) is shown in FIGS. 6-8, and a rivet style coupling is shown in FIGS. 10-14. These drawings and corresponding features will be described in detail below.

In some embodiments, as shown in FIG. 5, the electrochemical cell 46 may include one or more terminal covers 88 that may cover the weldable aluminum terminal pads 62, 64. Further, it should be noted that the electrochemical cell 46 may also include a vent and overcharge protection features, which are removed from the illustrated embodiment for purposes of simplicity.

FIG. 6 is a perspective view of an embodiment of the negative terminal assembly 50 having the weldable aluminum terminal pad 64. FIG. 7 is a cross-sectional perspective view of the negative terminal assembly 50 of FIG. 6 in a pre-press condition (with pressing tools 100 and 109 illustrated therein), and FIG. 8 is a cross-sectional perspective view of an embodiment of the negative terminal assembly 50 having the weldable aluminum terminal pad of FIG. 6 in a post-press condition. In accordance with present embodiments, a "press style coupling" is one in which a press having pneumatic and/or hydraulic actuation pushes against a first component of the terminal assembly (e.g., in the illustrated embodiment, a surface of the weldable aluminum terminal pad 64 of the negative terminal assembly 50) in order to deform the first component and/or a second component such that the first component is coupled to the second component.

For example, FIG. 7 is a cross-sectional perspective view of the negative terminal assembly 50 of FIG. 6 in a pre-press condition (i.e., prior to utilizing a tool 100 of a press utilizing hydraulic and/or pneumatic actuation 102 (referred to as a "press" herein) during arrangement/assembly of the negative terminal assembly 50). As shown, the negative terminal assembly 50 may include the current collector 83 (e.g., having a copper material) (or terminal connection component thereof), a lower insulating gasket 104 disposed between the cover 84 and the current collector 83, an upper insulating gasket 106 disposed between the weldable aluminum terminal pad 64 and the cover 84, and the weldable aluminum terminal pad 64 (although, in some embodiments, the cover 84 may also be considered a part of the terminal assembly 50). The lower insulating gasket 104 and the upper insulating gasket 106 may include a polymer or plastic material, such as a polyphenylene sulfide.

The weldable aluminum terminal pad 64 in the illustrated embodiment includes a recess 108 into a top surface 110 of the weldable aluminum terminal pad 64 (e.g., where the top surface 110 is the surface to which a bus bar may be welded, as previously described). The aforementioned tool 100 of the press 102 may be pressed into the recess 108 and against a recess wall 112 of the weldable aluminum terminal pad 64, while the illustrated assembly is held in place. The tool 100 of the press 102 may force the recess wall 112 and the current collector 83 toward a die 109 of the press 102, which includes a central ridge 113 protruding upwardly inside a cavity 111. The tool 100 of the press 102 causes the recess wall 112, and the current collector 83 below the recess wall 112, to deform downwardly (e.g., in a direction 116 parallel with a longitudinal axis 114 of the recess 108) into the die 109, where the die 109 and the tool 100 together exert forces against assembly. As the current collector 83 (and the recess wall 112) deforms downwardly, the current collector 83 (and recess wall 112) may eventually fill the bottom die 109, causing an inner surface of the current collector 83 to bulb outwardly in a direction 118 perpendicular to the longitudinal axis 114 of the recess 108 (e.g., by contacting a surface therebelow), as illustrated in the post-press condition of the assembly 50 in FIG. 8. In other words, the post-press condition of the assembly 50 includes a bulb 120 formed by the current collector 83 following the pressing process (utilizing hydraulic and/or pneumatic actuation), and the recess wall 112 is at least partially encapsulated/sheathed by the bulb 120 of the current collector 83 (or, as previously described, a terminal connection component between the current collector and the weldable aluminum terminal pad 64). "Bulb" used herein, namely when referring to the bulb 120 in FIG. 8, refers to the shape of the current collector 83 formed after the pressing process (i.e., in the post-press condition of FIG. 8). In other words, the bulb 120 defines an internal space 121 that receives the recess wall 112 of the weldable aluminum terminal pad 64. In particular, a lip 122 of the recess wall 112 may bulb outwardly within the internal space 121 defined by the bulb 120 of the current collector 83. Put differently, a minimum cross-sectional width 123 of the internal space 121 of the bulb 120 is greater than a maximum cross-sectional width 125. Thus, the current collector 83 is coupled to the weldable aluminum terminal pad 64, and a bus bar may be welded to the top surface 110 of the weldable aluminum terminal pad 64 (e.g., to couple to an adjacent pad of an adjacent cell). It should be noted the above-described features may also be used for the positive terminal assembly, except that the corresponding positive current collector includes aluminum. In some embodiments, two joints may be used for one terminal to provide anti-rotation function.

Figure 9:
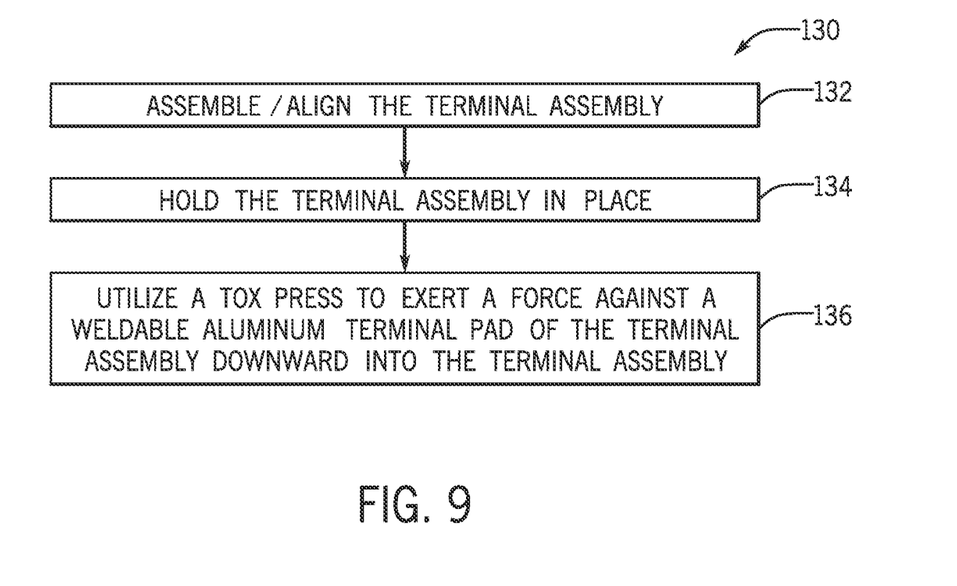
FIG. 9 is a process flow diagram illustrating an embodiment of a method of manufacturing the terminal assembly having the weldable aluminum terminal pad of FIG. 6, in accordance with an aspect of the present disclosure.

FIG. 9 is a process flow diagram illustrating an embodiment of a method 130 of manufacturing the terminal assembly 50 having the weldable aluminum terminal pad 64 of FIG. 6. In the illustrated embodiment, the method 50 includes assembling (e.g., aligning) the terminal assembly (block 132). For example, as previously described, the terminal assembly may include the current collector (or an intervening connection component), a weldable aluminum terminal pad, and at least one insulating gasket separating the weldable aluminum terminal pad from the cover and/or the cover from the current collector (or an intervening connection component). In some embodiments, the cover may be considered a part of the terminal assembly. In general, the terminal assembly may be arranged as shown in FIGS. 6-8, namely, aligned with respect to an opening through the cover, where the opening enables an electrical path of the terminal assembly to extend from inside the cell to an external area.

The method 130 also includes holding (block 134) the terminal assembly in place. For example, while a portion of the terminal assembly is contacted in a pressing process as previously described (utilizing hydraulic and/or pneumatic actuation), the rest of the terminal assembly is held in place to enable the portion of the terminal assembly to deform. It should be noted that, during the assembly/alignment step of block 132 and/or the holding step of block 134 (or some other step), a clearance may be disposed below the current collector. The clearance may control the compression of the gaskets, and may facilitate movement (e.g., deformation) of the current collector into the clearance, as described below.

The method 130 also includes utilizing a press to exert (block 136) a force against the weldable aluminum terminal pad downwardly into the terminal assembly. For example, the press may exert the force against a recess wall of the weldable aluminum terminal pad disposed in a recess of the weldable aluminum terminal pad. The recess wall and the current collector below the recess wall may then press into a bottom die, while the rest of the terminal assembly is held in place, thereby causing the recess wall and the current collector (or a portion of a flat wall thereof) to deform downwardly. As previously described, the current collector may fill into the bottom die cavity, and an inner surface of the current collector may bulb outwardly as the recess wall of the terminal pad is pressed into it, thereby generating a bulb in the current collector (e.g., on an inner surface of the current collector receiving the recess wall). The recess wall is at least partially encapsulated in the bulb, thereby coupling the weldable aluminum terminal pad with the current collector. As described above, the same process may be utilized for the positive terminal assembly, except that the positive current collector includes aluminum.

It should be noted that the embodiments illustrated in FIGS. 6-9 may involve disposing the assembly to be pressed on a substrate having an opening therein, where the opening is configured (e.g., shaped) to enable the press to push against the assembly, and to cause the assembly to form the aforementioned bulb. In other words, the combination of the press and the configuration of the opening in the substrate may enable the bulb-like shape of the pressed assembly. This may be referred to as "clinching," or a portion thereof. In general, the bulb-like shape may be referred to as a "clinched configuration." In some embodiments, this may be done via cold forming, while in other embodiments, the assembly may be heated.

Figure 10:
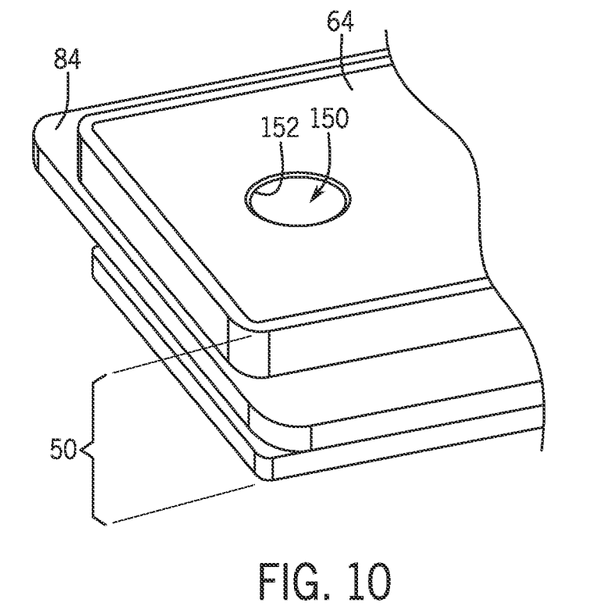
FIG. 10 is a perspective view of an embodiment of a terminal assembly having a weldable aluminum terminal pad for use in the electrochemical cell of FIG. 4, in accordance with an aspect of the present disclosure.
Figure 11:
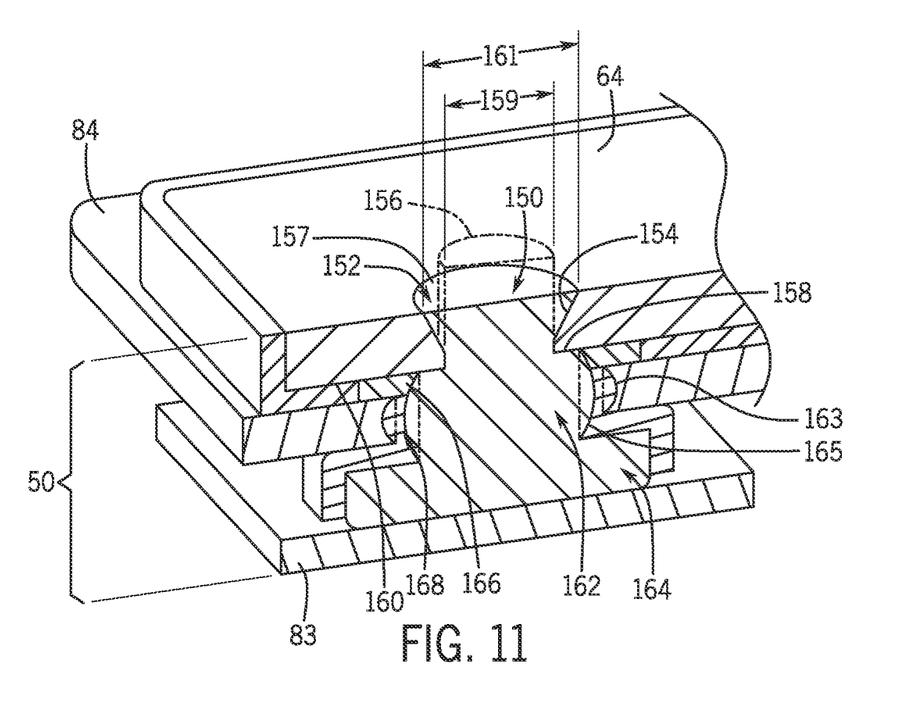
FIG. 11 is a cross-sectional perspective view of an embodiment of the terminal assembly having the weldable aluminum terminal pad of FIG. 10 in a post-crimp condition, in accordance with an aspect of the present disclosure.

FIG. 10 is a perspective view of an embodiment of the terminal assembly 50 having the weldable aluminum terminal pad 64 for use in the electrochemical cell 46 of FIG. 4, and FIG. 11 is a cross-sectional perspective view of an embodiment of the terminal assembly 50 having the weldable aluminum terminal pad 64 of FIG. 10. FIGS. 10 and 11 are directed toward embodiments of the terminal assembly 50 which utilize a crimping process to join the weldable aluminum terminal pad 64 with a rivet 150 (e.g., where the rivet 150 corresponds with one possible type of the terminal connection component 79 illustrated in FIG. 5). As shown in FIGS. 10 and 11, the weldable aluminum terminal pad 64 includes an opening 152 extending therethrough.

Focusing in particular on FIG. 11, the opening 152 extending through the weldable aluminum terminal pad 64 includes a tapered surface 154. In other words, the opening 152 is a tapered opening. Prior to the aforementioned crimping process, the rivet 150 includes a cylindrical head 156 illustrated schematically in FIG. 11 with dashed lines. The rivet 150 also includes a shoulder 158 contacting a bottom surface 160 of the weldable aluminum terminal pad 64. The shoulder 158 separates the cylindrical head 156 of the rivet 150 from a body portion 162 of the rivet 150. A base 164 of the rivet 150 is disposed below the body portion 162 of the rivet 150.

Similar to the embodiments illustrated in FIGS. 6-8, the terminal assembly 50 in FIGS. 10 and 11 includes an upper insulating gasket 166 positioned between the weldable aluminum terminal pad 64 and the cover 84, and a lower insulating gasket 168 disposed between the rivet 150 and the cover 84. As shown in FIG. 11, the current collector 83 is coupled with the base 164 of the rivet 150. Further, as shown in FIG. 11, the body portion 162 of the rivet 150 may bulge outwardly during the crimping process, thereby filling any potential gaps. The body portion 162 bulging outwardly may also cause the insulating gasket(s) 166 and/or 168 to be compressed, and/or bulge outwardly.

As discussed above, prior to the crimping process, the rivet 150 includes the cylindrical head 156. The cylindrical head 156 includes at least a portion extending above the aluminum terminal pad 64. During the crimping process, a crimp contacts the cylindrical head 156 while compressing the terminal assembly 50 together. The crimp causes the cylindrical head 156 to deform, filling the opening 152 in the weldable aluminum terminal pad 64. In other words, the cylindrical head 156 deforms into an inverted cone head 157 so as to contact the tapered surface 154 of the opening 152. Thus, following the crimping process, the inverted cone head 157 of the rivet 150 includes a greater cross-sectional width 161 (e.g., diameter) than a minimum cross-sectional width (e.g., diameter) 159 of the opening 152 in the weldable aluminum terminal pad 64.

Figure 12:
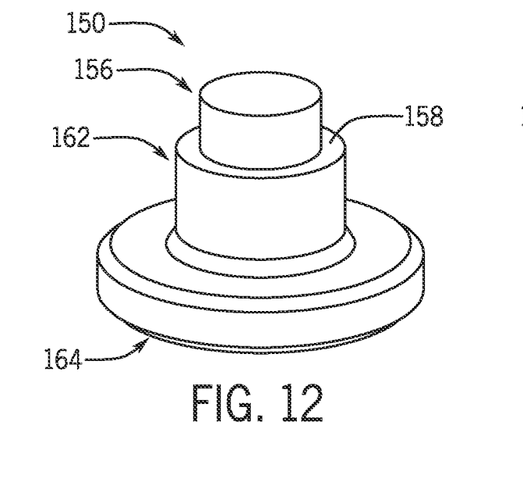
FIG. 12 is a perspective view of an embodiment of a rivet for use in the terminal assembly of FIG. 10, in accordance with an aspect of the present disclosure.
Figure 13:
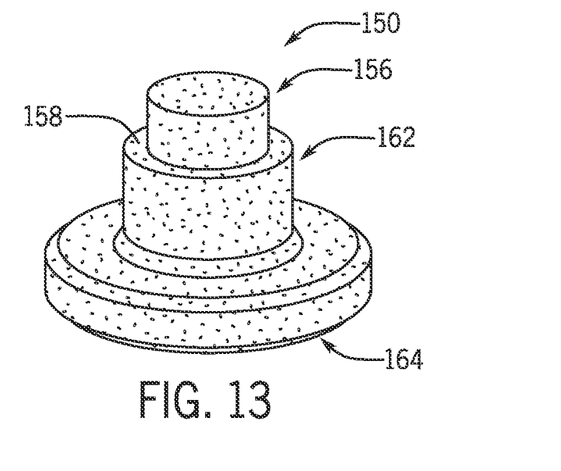
FIG. 13 is a perspective view of an embodiment of a rivet for use in the terminal assembly of FIG. 10, in accordance with an aspect of the present disclosure.
Figure 14:
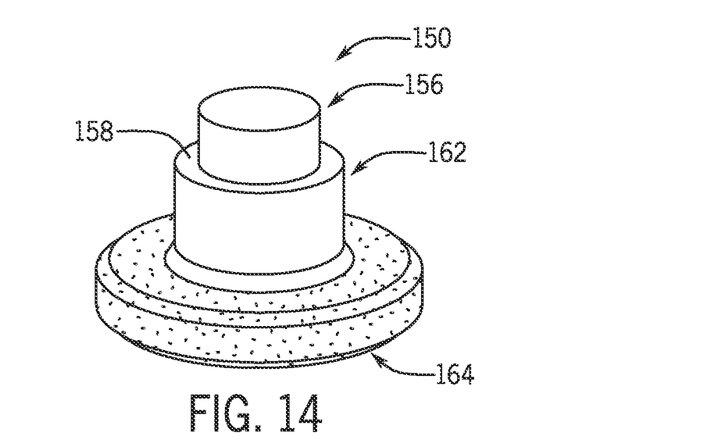
FIG. 14 is a perspective view of an embodiment of a rivet for use in the terminal assembly of FIG. 10, in accordance with an aspect of the present disclosure.

In addition to generating the inverted cone head 157, the crimping process may also compress the gaskets 166, 168 of the negative terminal assembly 50. The shoulder 158 of the rivet 150 may be sized to facilitate a desired compression ratio of the gaskets 166, 168 (i.e., a ratio of a final thickness of the gasket with respect to an initial thickness of the gasket). For example, the shoulder 158 may block the weldable aluminum terminal pad 64 from excessively compressing the upper insulating gasket 166. The crimping process may be carried out by an orbital riveting machine, by a press, or by the like. Examples of the rivet 150 pre-crimping process are illustrated in FIGS. 12 (an all aluminum rivet 150), 13 (an all copper rivet 150), and 14 (a bi-metallic rivet 150 having an aluminum post and a copper base friction welded together).

Figure 15:
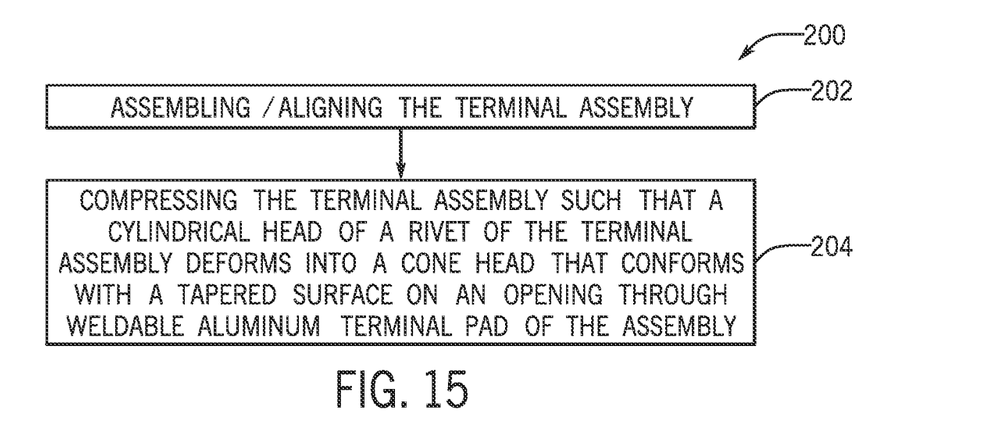
FIG. 15 is a process flow diagram illustrating an embodiment of a method of manufacturing the terminal assembly having the weldable terminal pad of FIG. 10, in accordance with an aspect of the present disclosure.

FIG. 15 is a process flow diagram illustrating an embodiment of a method 200 of manufacturing the terminal assembly having the weldable terminal pad of FIG. 10. In the illustrated embodiment, the method 200 includes assembling (e.g., aligning) the terminal assembly (block 202). For example, as previously described, the terminal assembly may include the current collector (e.g., copper current collector), a weldable aluminum terminal pad, a rivet (e.g., copper rivet or bi-metal rivet) extending between the current collector and the weldable aluminum terminal pad, and at least one insulating gasket separating the weldable aluminum terminal pad from the cover and/or the cover from the rivet (and/or current collector). The terminal assembly may be aligned such that a cylindrical head of the river extends through an opening in the weldable aluminum terminal pad, where the opening includes a tapered surface as previously described. In general, the terminal assembly may be arranged as shown in FIGS. 10 and 11.

The method 200 also includes crimping (block 204) the terminal assembly together. For example, a crimp may press into an upper surface of the cylindrical head of the rivet (e.g., while the crimp, or a substrate surface, press against the other side of the terminal assembly). As the crimp presses into the upper surface of the cylindrical head of the rivet, the cylindrical head deforms toward the tapered surface of the opening in the weldable aluminum terminal pad. In other words, the cylindrical head deforms into an inverted cone head that complies with the tapered surface of the opening. Accordingly, the inverted cone head includes a maximum cross-sectional width larger than a minimum cross-sectional width of the opening in the weldable aluminum terminal pad. The minimum cross-sectional width of the opening, then, constrains the rivet in place. As previously described, as the crimp presses into the top surface of the head of the rivet, a shoulder of the rivet separating the head of the rivet from a body of the rivet may press against a bottom surface of the weldable aluminum terminal pad (e.g., as shown in FIGS. 10 and 11, and described above). Thus, the shoulder of the rivet may block the weldable aluminum terminal pad from excessively compressing an insulating gasket (e.g., the shoulder enables a desired compression ratio, or ratio of final thickness of the insulating gasket over initial thickness of the insulating gasket).

One or more of the disclosed embodiments, alone or on combination, may provide one or more technical effects including the manufacture of battery modules having only or mostly aluminum-to-aluminum welding of bus bars between adjacent terminals of adjacent electrochemical cells. Aluminum-to-aluminum welds are desirable, as previously described, to reduce a part cost of electrochemical cells and the corresponding battery module, to reduce a likelihood of leakage into or out of electrochemical cells of the battery module, and for simplicity of manufacturing. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electrochemical cell, comprising:
a cover having an opening;
a terminal pad having:
a first portion having a top surface and a first portion wall, the first portion being disposed proximate an outer surface of the cover;
a recess integrated with the first portion in a single unitary construction, the recess including:
a recess wall contiguous to the first portion wall and including an annular side portion and a bottom portion contiguous to the annular side portion, the bottom portion having a bottom surface not coplanar with the top surface of the first portion of the terminal pad, the annular side portion extending downwardly from the first portion of the terminal pad through the opening in the cover to the bottom portion, the bottom portion being defined by the annular side portion; and
a current collector having a bulb forming an internal space that captures and retains at least a portion of the annular side portion and an entirety of the bottom portion of the recess wall of the recess within the internal space of the bulb in a clinched configuration.

2. The electrochemical cell of claim 1, wherein the current collector includes a copper material.

3. The electrochemical cell of claim 1, wherein the electromechanical cell further includes a coil stack, the current collector includes a first part that couples with the coil stack of the electrochemical cell, and a second part that forms the bulb.

4. The electrochemical cell of claim 1, wherein the electrochemical cell further includes an aluminum bus bar welded to the terminal pad.

5. The electrochemical cell of claim 1, wherein the electrochemical cell further includes at least one insulating gasket disposed one of between the terminal pad and the cover, and between the cover and the current collector.

6. The electrochemical cell of claim 5, wherein the at least one insulating gasket comprises a first insulating gasket disposed between the terminal pad and the cover, and a second insulating gasket disposed between the cover and the current collector.

7. The electrochemical cell of claim 1, wherein the current collector comprises an aluminum material, and the terminal pad is an aluminum terminal pad.

8. The electrochemical cell of claim 1, wherein the cover comprises an aluminum material.

9. The electrochemical cell of claim 1, comprising:
a housing; and
at least two coil stacks electrically connected and disposed in the housing, the current collector being electrically connected to the at least two coil stacks.

10. The electrochemical cell of claim 1, wherein the electrochemical cell is a lithium-ion electrochemical cell.

11. A method of manufacturing a terminal assembly of an electrochemical cell, the method comprising:
assembling the terminal assembly, the assembled terminal assembly including a cover, a terminal pad, and a current collector, the cover having an opening, the terminal pad having:
a first portion having a top surface and a first portion wall, the first portion being disposed proximate an outer surface of the cover;
a recess integrated with the first portion in a single unitary construction, the recess including:
a recess wall contiguous to the first portion wall and including an annular side portion and a bottom portion contiguous to the annular side portion, the bottom portion having a bottom surface not coplanar with the top surface of the first portion of the terminal pad, the annular side portion extending downwardly from the first portion of the terminal pad through the opening in the cover to the bottom portion, the bottom portion being defined by the annular side portion; and
exerting a force against the terminal pad downward into the terminal assembly, the exerted force causing the current collector to form a bulb having an internal space that captures and retains at least a portion of the annular side portion and an entirety of the bottom portion of the recess wall of the recess within the internal space of the bulb in a clinched configuration.

12. The method of claim 11, wherein the assembled terminal assembly further includes a lower insulating gasket disposed between the cover and the current collector, and an upper insulating gasket disposed between the terminal pad and the cover.

13. The method of claim 11, wherein exerting the force includes pressing against the recess wall.

14. The method of claim 13, wherein pressing against the recess wall forces the recess wall and the current collector toward a die.

15. The method of claim 14, wherein the die includes a central ridge protruding upwardly inside a cavity of the die, the recess wall and the current collector filling the die and forming the bulb.

16. The method of claim 15, wherein the recess wall has a lip bulging outwardly within the internal space.

17. The method of claim 11, wherein the method further includes:
holding the terminal assembly to exert the force.

18. The method of claim 11, wherein the method further includes:
utilizing a press to exert the force against the terminal pad.

19. The method of claim 11, wherein capturing and retaining at least a portion of the annular side portion and an entirety of the bottom portion of the recess wall of the recess within the internal space of the bulb in the clinched configuration couples the terminal pad with the current collector.

* * * * *

UNITED STATES PATENT AND TRADEMARK OFFICE
CERTIFICATE OF CORRECTION

| | |
|---|---|
| PATENT NO. | : 12,040,443 B2 |
| APPLICATION NO. | : 17/545548 |
| DATED | : July 16, 2024 |
| INVENTOR(S) | : Xugang Zhang and Jason D. Fuhr |

It is certified that error appears in the above-identified patent and that said Letters Patent is hereby corrected as shown below:

In the Drawings

1. In Fig. 9, Sheet 6 of 8, for Tag "136", delete "A TOX" and insert -- A --, therefor.

In the Specification

2. In Column 1, Line 10, delete "2018," and insert -- 2018, now U.S. Pat. No. 11,233,289, --, therefor.

3. In Column 1, Line 44, delete "mild hybrid systems (MHEVs)" and insert -- mild hybrid electric vehicles (MHEVs) systems --, therefor.

4. In Column 2, Line 63, delete "DRAWINGS" and insert -- BRIEF DESCRIPTION OF THE DRAWINGS --, therefor.

5. In Column 3, Line 1, delete "lithium ion" and insert -- lithium-ion --, therefor.

6. In Column 4, Lines 8-9, delete "storage/expending" and insert -- storage/expanding --, therefor.

7. In Column 5, Line 39, delete "lithium ion" and insert -- lithium-ion --, therefor.

8. In Column 5, Lines 62-63, delete "stationary storage system 16)." and insert -- stationary energy storage system 16). --, therefor.

9. In Column 6, Line 27, delete "side-by side" and insert -- side-by-side --, therefor.

10. In Column 7, Line 36, delete "weldable terminal pad 64" and insert -- weldable aluminum terminal pad 64 --, therefor.

11. In Column 8, Line 6, delete "positive terminal 48" and insert -- positive terminal assembly 48 --, therefor.

Signed and Sealed this
Third Day of September, 2024

*Katherine Kelly Vidal*

Katherine Kelly Vidal
*Director of the United States Patent and Trademark Office*

CERTIFICATE OF CORRECTION (continued)
U.S. Pat. No. 12,040,443 B2

12. In Column 10, Line 6, delete "method 50" and insert -- method 130 --, therefor.

13. In Column 11, Line 27, delete "includes" and insert -- include --, therefor.

14. In Column 11, Line 41, delete "aluminum terminal pad 64." and insert -- weldable aluminum terminal pad 64. --, therefor.

15. In Column 12, Line 46, delete "on" and insert -- in --, therefor.